2,883,264

SOLVENT EXTRACTION OF THORIUM VALUES FROM AQUEOUS SOLUTIONS

James C. Warf, Los Angeles, Calif., assignor to the United States of America as represented by the United States Atomic Energy Commission No Drawing. Application October 18, 1950
Serial No. 190,866

11 Claims. (Cl. 23—14.5)

This invention deals with the separation of metal values from aqueous solutions by means of extraction with an alkyl phosphate and in particular with the separation of actinide elements in at least the tetravalent state and tetravalent cerium values.

It is an object of this invention to provide a process for separating metal values from aqueous solutions by means of extraction with alkyl phosphate in which an especially fast and complete separation of the phases is obtained.

It is another object of this invention to provide a process for separating metal values from aqueous solutions by means of extraction with alkyl phosphate in which a high degree of metal separation is obtained so that a high yield of the metal to be produced or recovered is effected.

It is another object of this invention to provide a process for separating metal values from aqueous solutions by means of extraction with alkyl phosphate in which the metal compounds are obtained in a high degree of purity.

It is another object of this invention to provide an improved process for separating actinide metal values and cerium values from rare earth metal values contained in aqueous solution by means of extraction with alkyl phosphate.

It is still another object of this invention to provide an improved process for decontaminating uranium values from ruthenium and other fission product values contained in aqueous solutions by means of extraction with alkyl phosphate.

These and other objects are accomplished by diluting the substantially water-immiscible alkyl phosphate extractant with a hydrocarbon, and contacting the aqueous solution with this mixture; the aqueous phase is then separated from the solvent extract phase formed.

Alkyl phosphates that are most suitable as extractants are of relatively high density and viscosity, due to which phase separation is rather difficult and slow. This disadvantage is overcome by the use of a diluent. The mixture of hydrocarbon and alkyl phosphate, according to this invention, yielded the further unexpected advantage of a considerable increase of extraction.

While the extraction according to this invention may be carried out from any aqueous salt solution, it is preferred to use solutions containing free mineral acid; hydrochloric acid and, in particular, nitric acid are suitable in a concentration ranging from 0.1 to 7 N, higher acid concentrations resulting in higher extraction values. In the case of nitric acid, a concentration of from 1 to 7 N, and preferably of from 3 to 7 N, is satisfactory. The following example illustrates the effect of the acid concentration.

EXAMPLE I

An aqueous solution containing uranyl nitrate and nitric acid, the latter in a concentration of 0.02 N, was contacted with a mixture of 20% by volume of tributyl phosphate and 80% by volume of hexane; a distribution factor or coefficient (organic/aqueous) of 0.25 was obtained. An almost identical test but with a nitric acid concentration of 5.46 N yielded a distribution factor of 20.5.

All alkyl phosphates, which are substantially water-immiscible and stable, and in particular which do not decompose, at least substantially, with the acid and/or the metal salts present in the aqueous solution to be treated, are suitable for the process of this invention. Alkyl phosphates of the formula $R_2R'PO_4$, where R indicates either an alkyl radical or a hydrogen atom and R' an alkyl radical, have been used successfully. For instance, tributyl phosphate, trioctyl phosphate, dioctyl hydrogen phosphate, trihexyl phosphate, octadecyl dihydrogen phosphate and mixtures thereof are suitable for the process of this invention.

The diluents for the alkyl phosphate solvent preferably have a specific gravity less than 0.8. The diluents should also preferably have a low viscosity and should be miscible with the alkyl phosphate. It is also desirable that the diluents have a low volatility and a high flash point, preferably a flash point higher than 35° C. so that fire hazards are reduced. Finally the diluent, just like the solvent, has to be stable to the strong acids used and, in particular, to concentrated nitric acid. A great number of hydrocarbons were found to have the required properties; examples of suitable diluents are: hexane, n-heptane, n-octane, decane, n-alkanes having 12, 13 or 14 carbon atoms in the chain, cyclohexane, methylcyclohexane, benzene and kerosene. Mixtures of hydrocarbons, e.g. petroleum fractions, are also suitable diluents; in particular, the fractions sold under the trade names of "Esso Varsol" and "Gulf BT" have given satisfactory results. "Varsol" consists of about 60% paraffin, 30% naphthene and 10% aromatics; it has a specific gravity of 0.75, a boiling point of between 167 and 180° C. and a flash point of 49° C. "Gulf BT" has very similar chemical and physical properties. "Varsol," however, was found to react with concentrated nitric acid, for instance, with nitric acid of above 9 N even at room temperature. This difficulty can be easily overcome, though, and the "Varsol" can be stabilized by pretreating it with concentrated nitric acid whereby the reactive component is removed.

EXAMPLE II

All of the diluents listed in the preceding paragraph were tested in a number of comparative experiments. For this purpose aqueous solutions containing 0.1 M uranium in the form of uranyl nitrate and 3.0 N nitric acid were equilibrated each with a mixture of 10% by volume of tributyl phosphate and 90% of the indicated diluent. It was found that there was no critical discrepancy between the efficiency of the various diluents; the distribution coefficients (organic/aqueous) varied from 2.5 to 4.5.

The proportions between solvent and diluent are not critical, and it will be readily understood that a higher solvent content brings about a higher extraction efficiency per se, while a higher content of diluent will facilitate phase separation and thereby improve the degree of separation desired. It was found that the mixture advantageously contains at least 60% by volume of diluent but not more than 97%, a content of from 75 to 95% being preferred. One of the preferred mixtures contains from 15 to 40%, preferably from 15 to 25% by volume of tributyl phosphate in hexane.

A further factor which has a favorable effect on the extraction is the presence of a salting-out agent. While the acids preferably present in the aqueous solution act as salting-out agent, additional water-soluble salts give better results. It is especially advantageous to add a water-soluble salt that contains the same anions as the salt present of the metal values to be recovered or extracted. The salting-out agent is advantageously present in a concentration of at least 3 N and preferably of from 5 to 10 N.

Equilibration between the solvent phase and the aqueous phase is accelerated by agitation or other means known to those skilled in the art.

The process of this invention has a great number of applications. For instance, it is usable for the extraction of uranium values from aqueous solutions such as have been obtained from monazite sand, pitchblende, carnotite and other uranium-containing minerals. The process has also been found advantageous for the treatment of uranium metal solutions obtained from power-producing neutronic reactors where the uranium is to be separated from the fission product values before re-use. The extraction of uranium from such solutions is illustrated in the following example.

EXAMPLE III

A solution of uranyl nitrate containing 3 N nitric acid was contacted countercurrently with a mixture of 85% hexane and 15% tributyl phosphate. The organic solvent extract phase was scrubbed with a 3 N nitric acid solution, and then the solvent phase was contacted countercurrently with water for removing uranium values from the solvent. The extraction and re-extraction were carried out in countercurrent batch tubes for three minutes using five extraction stages, four crub stages and five stages of removing uranium values with water. The flow ratio of organic solvent:feed solution:scrub solution:strip water was 10:3:2:10. Of the uranium originally present in the feed solution, 99.9% was found in the water strip solution, which proves that practically all uranium had been extracted into the solvent phase and re-extracted by the water.

EXAMPLE IV

The extractability of thorium nitrate with a mixture of tributyl phosphate and benzene is illustrated in the following table; this table also illustrates the function between phase separation time and solvent:diluent ratio. The thorium solution was 0.445 M in $Th(NO_3)_4$, 3 M in $Ca(NO_3)_2$ and 3 M in $HNO_3$.

table. For these tests the aqueous phase was 0.2 M in uranyl nitrate hexahydrate and 0.2 M in thorium nitrate tetrahydrate. Ten ml. of aqueous solution were equilibrated in each instance with 10 ml. of the solvent mixture, and a temperature of 25° C. was maintained for both liquids. The settling times, which are the times for the formation of the interphase, were determined after shaking by hand for one minute. The distribution coefficients (organic/aqueous) were determined after an equilibration of thirty minutes.

*Table II*

| $HNO_3$ Concn. in Orig. Aq. Phase, N | 25% Tributyl Phosphate+75% Hexane | | 50% Tributyl Phosphate+50% Hexane | |
|---|---|---|---|---|
| | Settling time, sec. | Distribution coefficient uranium | Settling time, sec. | Distribution coefficient uranium |
| 1 | 12 | 4.0 | 65 | 11 |
| 3 | 12 | 9.5 | 60 | 20 |
| 5 | 13 | 10.0 | 55 | 28 |
| 7 | 15 | 8.2 | 60 | 14 |
| 9 | 15 | 4.6 | 70 | 13 |
| 11 | 30 | 3.1 | 60 | 8.9 |

This table also very clearly illustrates the reduction of the settling times by the use of a higher percentage of diluent.

The process of this invention is furthermore applicable to the separation of thorium values from rare earth metal values which is of importance, for instance, in the case of the recovery of elements from monazite sand solutions or similarly composed mineral solutions.

EXAMPLE VI

A series of batch tests was carried out with an aqueous nitric acid solution obtained from dissolving monazite sand and containing 38 mg. of $U_3O_8$, 1130 mg. of $ThO_2$, 5605 mg. of rare earth metal oxides, 5073 mg. of $Ce_2O_3$ and 164 mg. of $P_2O_5$ per 100 ml. of solution; the solution was 5 N in nitric acid. A volume of 50 ml. of this aqueous solution was equilibrated at 25° C. for thirty minutes with an equal volume each time of a solvent mixture as specified in the table given below.

*Table III*

| Solvent | Molar Concn. of Nitric Acid in Aqueous Phase after Equilibration | Settling Time, sec. | Distribution Coefficients (organic/aqueous) | | Thorium—Rare Earth Separation (Distribution Ratio of Thorium/Distribution Ratio of Rare Earths) |
|---|---|---|---|---|---|
| | | | Thorium | Rare Earths | |
| 25% $Bu_3PO_4$, 75% Hexane | 4.5 | 10 | 1.3 | 0.006 | 217 |
| 50% $Bu_3PO_4$, 50% Hexane | 3.9 | 20 | 4.5 | 0.07 | 64 |

*Table I*

| Volume Percent Benzene | Specific Gravity | Percent Thorium Extracted in One Extraction | Phase Separation Time, Seconds |
|---|---|---|---|
| 0 | 1.076 | 100 | |
| 10 | 0.966 | 98 | 90 |
| 30 | 0.945 | 90 | 60 |
| 50 | 0.924 | 82 | 30 |
| 75 | 0.898 | 45 | 21 |
| 90 | 0.883 | 20 | 15 |
| 100 | 0.872 | 0 | |

EXAMPLE V

That the process of this invention is very well suitable for the separation of uranium values from aqueous solutions varying widely in nitric acid concentration is obvious from the set of experiments compiled in the following This table shows that an excellent separation of the thorium salts from rare earth metal salts can be accomplished by the process of this invention.

EXAMPLE VII

Another series of similar batch tests was carried out with a synthetic monazite sand aqueous solution and a mixture of tributyl phosphate and hexane (50:50) as the solvent. The aqueous solution contained uranyl nitrate, thorium nitrate and rare earth metal nitrates. Analysis of the solvent extract phase obtained and the remaining aqueous phase showed that less than 0.3% of uranium and thorium initially present had remained in the aqueous solution. It was also ascertained that the separation of thorium from the rare earth metal values was $2 \times 10^3$ and that of uranium from the rare earth metal values greater than $4 \times 10^3$.

Another very useful application of the process of this invention is for the separation of uranium from ruthenium. Tests carried out with tributyl phosphate in mixture with hexane and methylcyclohexane, respectively, gave similarly satisfactory results as the experiments described above, the ruthenium mainly remaining in the aqueous phase while the uranium was preferredly extracted into the solvent phase.

The invention is also advantageous for the extraction and recovery of cerium values from aqueous solutions. However, the cerium has to be present in the tetravalent state, and it is therefore necessary to treat the solution prior to cerium extraction for conversion of the cerium to the tetravalent state. This can be done either electrolytically or by chemical methods, for instance by treating the solution with a bromate solution in concentrated nitric acid, such as sodium bromate in 8 to 10 N nitric acid.

Likewise, plutonium values are extractable according to the process of this invention provided that it is present in at least the tetravalent state. Plutonium (III) salts are not extractable. It is preferred that plutonium be present in the tetravalent state. In order to reduce hexavalent plutonium and secure plutonium in the preferred tetravalent state, it is preferably first reduced to the trivalent state and then oxidized with sodium nitrite.

In all the cases described herein, the extracted metal values may be back-extracted from the solvent phase either collectively or selectively by various methods known to those skilled in the art.

Well-known extraction procedures and apparatus may be used in carrying out the process of this invention. Thus, the extraction steps may be effected by the use of batch, continuous batch, batch countercurrent or continuous countercurrent methods. An especially efficient extraction is obtained by the use of the continuous countercurrent method. In all cases, the ratio of liquid organic solvent to initial aqueous solution may vary widely, e.g., from 1:10 to 10:1, and the optimum ratio will depend upon the particular organic solvent and the concentrations used. The organic solvent may be either the dispersed phase or the continuous phase; however, the former is the preferred type.

The extraction of uranium and of cerium with alkyl phosphate is covered by applicant's copending applications Serial No. 142,707, filed February 6, 1950, and granted as U.S. Patent No. 2,848,300 on August 19, 1958, and Serial No. 92,956, filed May 12, 1949, and granted as U.S. Patent No. 2,564,241 on August 14, 1951, respectively.

It will be understood that this invention is not to be limited to the details given herein but that it may be modified within the scope of the appended claims.

What is claimed is:

1. A process for separating thorium values from rare earth metal values contained in aqueous solutions, comprising providing a content of mineral acid of from 3 to 7 N in said solution, mixing a substantially water-immiscible alkyl phosphate and a hydrocarbon, contacting the aqueous solution with the organic mixture obtained, and separating an aqueous phase containing said rare metal valves from a solvent extract phase containing said thorium values.

2. The process of claim 1 wherein the alkyl phosphate is tributyl phosphate.

3. The process of claim 1 wherein the alkyl phosphate is trioctyl phosphate.

4. The process of claim 1 wherein the alkyl phosphate is dioctyl hydrogen phosphate.

5. The process of claim 1 wherein the alkyl phosphate is octadecyl dihydrogen phosphate.

6. The process of claim 1 wherein the hydrocarbon is hexane.

7. The process of claim 1 wherein the hydrocarbon is methyl cyclohexane.

8. The process of claim 1 wherein the hydrocarbon is a petroleum fraction containing 60% paraffin, 30% naphthene and 10% aromatics of a specific gravity of 0.75 and a boiling point between 167° and 180° C.

9. The process of claim 1 wherein at least 60% by volume of hydrocarbon are mixed with at least 3% of alkyl phosphate.

10. The process of claim 12 wherein from 15 to 25% of tributyl phosphate are mixed with from 85 to 75% by volume of hydrocarbon.

11. The process of claim 1 wherein the hydrocarbon is hexane and the alkyl phosphate is tributyl phosphate.

References Cited in the file of this patent

UNITED STATES PATENTS

| | | |
|---|---|---|
| 1,966,729 | Loomis | July 17, 1934 |
| 1,968,544 | Vana | July 31, 1934 |
| 2,225,633 | Hill et al. | Dec. 24, 1940 |
| 2,227,833 | Hixson et al. | Jan. 7, 1941 |

OTHER REFERENCES

Templeton et al.: "Journal of Physical and Colloid Chemistry," vol. 51, pp. 1441–1449 (1947).